United States Patent [19]

Nicols

[11] Patent Number: 4,991,023

[45] Date of Patent: Feb. 5, 1991

[54] MICROPROCESSOR CONTROLLED UNIVERSAL VIDEO MONITOR

[75] Inventor: Gary H. Nicols, Auburn, Calif.

[73] Assignee: Hewlett-Packard Company, Palo Alto, Calif.

[21] Appl. No.: 355,729

[22] Filed: May 22, 1989

[51] Int. Cl.[5] ........................ H04N 5/68; H04N 5/57

[52] U.S. Cl. .................................... 358/242; 340/744; 358/903; 358/168; 358/169

[58] Field of Search .................... 358/242, 64, 65, 903, 358/185, 168, 169, 171, 174; 340/720, 744

[56] References Cited

U.S. PATENT DOCUMENTS

| | | | |
|---|---|---|---|
| 3,980,926 | 9/1976 | Krueger | 340/744 |
| 4,321,597 | 3/1982 | Martin | 340/744 |
| 4,507,683 | 3/1985 | Griesshaber et al. | 358/185 |
| 4,518,986 | 5/1985 | Hinn et al. | 358/65 |
| 4,656,604 | 4/1987 | van Loon | 358/903 |
| 4,680,599 | 7/1987 | Wertz et al. | 340/744 |
| 4,694,350 | 9/1987 | Hinn | 358/242 |
| 4,855,813 | 8/1989 | Russell et al. | 358/903 |

*Primary Examiner*—John K. Peng

[57] ABSTRACT

A microprocessor controlled video montior is presented. The video monitor is able to automatically adjust the values of its parameters to adjust to operation on a number of different computer systems. The video monitor includes control lines, digital-to-analog converters and a control processor. The control processor, through the digital-to-analog converters, controls the values of the parameters of the video monitor. Stored in a non-volatile memory are entries which contain values of video monitor parameters. The control processor recognizes different computing systems on the basis of the frequency and polarity of horizontal and vertical synchronization signals. When either frequency or polarity of either the horizontal or vertical synchronization signals changes, the control processor will search the non-volatile memory for an entry in which values stored for both the frequency and polarity of both the horizontal and vertical synchronization signals matches the currently measured frequency and polarity of the horizontal and vertical synchonization signals. If a match is found the values for the parameters stored in the entry are applied by the control processor through the digital-to-analog converters to the control lines. A user may adjust certain parameters through the use of switches which are periodically polled by the control processor. When the control processor receives instructions from a user through manipulation of the switches the control processor makes the specified changes to the video monitor parameters and stores the new values in non-volatile memory.

22 Claims, 13 Drawing Sheets

MICROPROCESSOR CONTROLLED UNIVERSAL VIDEO MONITOR

BACKGROUND

The present invention concerns a monitor, controlled by a microprocessor, which may be used with a variety of computer systems.

Improvements in technology and varying performance requirements have spawned a variety of different standards for monitors. Typically, monitors have been designed to function under one standard. When a monitor is capable of being switched from a first computer system to a different computer system various adjustments are typically required to various potentiometers and variable inductors in order insure optimum performance of the monitor with the different computer system.

SUMMARY OF THE INVENTION

In accordance with the preferred embodiment of the present invention a microprocessor controlled video monitor is presented. The video monitor is able to automatically adjust the values of its parameters to adapt to operation on a number of different computer systems.

The video monitor includes control lines, digital-to-analog converters and a control processor. The control processor, through the digital-to-analog converters, controls the values of the parameters of the video monitor.

Stored in a non-volatile memory are entries which contain values of video monitor parameters. The control processor can access and modify the entries. The control processor recognizes different computing systems on the basis of the frequency and polarity of horizontal and vertical synchronization signals.

When either frequency or polarity of either the horizontal or vertical synchronization signals changes, the control processor will search the non-volatile memory for an entry in which values stored for both the frequency and polarity of both the horizontal and vertical synchronization signals matches the currently measured frequency and polarity of the horizontal and vertical synchronization signals. If a match is found the values for the parameters stored in the entry are applied by the control processor through the digital-toanalog converters to the control lines. If a match is not found the control processor applies default values for some parameters and applies an algorithm to determine control values for other parameters.

A user may adjust certain parameters such as video display vertical size, video display horizontal size, brightness of the video display, contrast of the video display, horizontal centering of the display and vertical centering of the display. This is done through the use of switches which are periodically polled by the control processor. When the control processor receives instructions from a user through manipulation of the switches the control processor makes the specified changes to the video monitor parameters. The control processor indicates to the user the adjustments made through light emitting diodes (LEDs) or other feedback means. The current values for parameters are periodically stored in the memory.

The preferred embodiment of the present invention also includes a connector which allows an external processor to control the monitor and to access the non-volatile memory. This allows for automatic adjustment of the monitor thereby eliminating the need for skilled workers to make these adjustments. The parameters available for adjustment include gain of a red video signal video amplifier, gain of a green video signal video amplifier, gain of a blue video signal video amplifier, red video signal DC voltage level, green video signal DC voltage level and blue video signal DC voltage level.

DESCRIPTION OF THE PREFERRED EMBODIMENT

Figure 1:
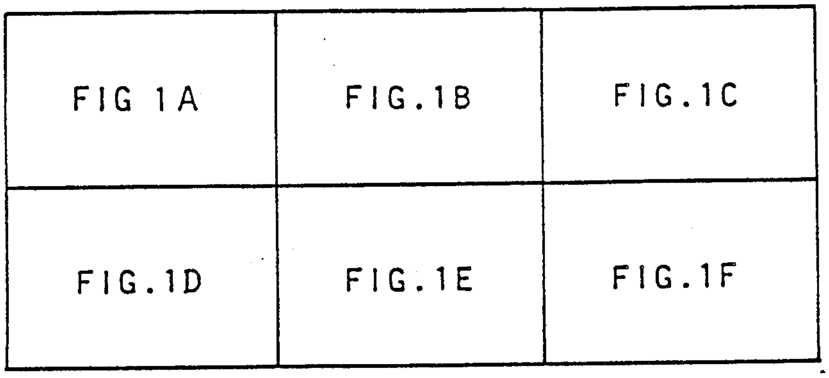
FIGS. 1 and 1A–1F shows a block diagram of a microprocessor controlled universal monitor in accordance with the preferred embodiment of the present invention.

FIG. 1 shows a block diagram of a monitor in accordance with the preferred embodiment of the present invention. The monitor receives a video signal on a line 47, a video signal on a line 48 and a video signal on a line 49. Each of the video signals received on lines 47–49 represent one of the colors red, blue or green. The monitor also receives a vertical synchronization signal and a horizontal signal. These may be received in the form of a composite horizontal and vertical synchronization signal on a line 27. The composite horizontal and vertical synchronization signal on line 27 may be derived from synchronization signals placed, for example, on line 48 composite with the green video signal. Alternately these may be received in the form of a separate horizontal synchronization signal on line 27 and a separate vertical synchronization signal on a line 61.

A polarity rectifier/identifier 6 receives the signal on line 27 and provides a horizontal polarity signal on a line 28 to a microprocessor 1. Microprocessor 1 is for example an 8049 microprocessor with ROM and RAM available from Intel Corporation, located at 3065 Bowers Avenue, Santa Clara, Calif. The horizontal polarity signal indicates to microprocessor 1 the polarity of the horizontal synchronization signal. Polarity rectifier-/identifier 6 also provides the horizontal synchronization signal to microprocessor 1 on a line 30. The polarity of the signal on line 30 is rectified and is independent of the polarity of the signal on line 27.

If the signal on line 27 is a composite horizontal and vertical synchronization signal, a composite sync separator 7, connected to line 30, separates out the vertical synchronization signal and sends the vertical synchronization signal on a line 32 through a logical "OR" gate 9 to a polarity rectifier/identifier 8. Alternately, if there is a separate vertical synchronization signal on line 61, polarity rectifier/identifier 8 receives the vertical synchronization from line 61 through logical "OR" gate 9. Polarity rectifier/identifier 8 provides a vertical polarity signal on a line 29 to microprocessor 1. The vertical polarity signal indicates to microprocessor 1 the polarity of the vertical synchronization signal. Polarity rectifier/identifier 8 also provides the vertical synchronization signal to microprocessor 1 on a line 31. The polarity of the signal on line 31 is rectified and is independent of the polarity of the signal on line 61.

Polarity rectifier/identifier 6 also provides the horizontal synchronization signal to an adjustable delay 10. Adjustable delay 10 delays the horizontal synchronization signal to allow for horizontal centering of the display. Adjustable delay 10 forwards the delayed horizontal synchronization signal to a pulse generator 11. Pulse generator 11 generates pulses at the frequency of operation of the horizontal synchronization signal. A phase comparator 13 receives the pulses generated by pulse generator 11 and compares the frequency signal generated by a horizontal oscillator 14. Phase comparator 13 generates a "locked" signal, placed on a line 41, which informs microprocessor 1 when the pulses generated by pulse generator 11 are locked in synchronization with the signal generated by a horizontal oscillator 14. Phase comparator 62 also supplies a control signal through a line 62 to horizontal oscillator 14. The control signal is an error signal which adjusts the horizontal oscillation frequency so that phase error will be reduced.

Horizontal oscillator 14 provides an oscillating signal through an adjustable delay 15 to a line 63 which serves as input to a horizontal deflection circuitry 17. Horizontal deflection circuitry 17 drives horizontal windings 25 of a deflection yoke controlling the horizontal position of collision by electrons on the screen of the monitor.

A horizontal flyback signal from horizontal deflection circuitry 17 is received by a horizontal blanking generator 18. Horizontal blanking generator 18 produces a signal with digital pulses of the same period and phase as pulses in the horizontal flyback signal. The signal produced by horizontal blanking generator 18 is received by a simulated flyback generator 19. Simulated flyback generator 19 produces a signal with digital pulses that are delayed with respect to pulses produced by horizontal blanking generator 18. The signal produced by simulated flyback generator 19 is forwarded to a phase comparator 16. Horizontal blanking generator 18 generates a signal which is sent to video amplifiers 46 through a line 69 and through a gate 74. The signal causes video amplifiers 46 to turn off during horizontal retrace. Similarly a vertical blanking signal provided by pulse generator 21 is sent to video amplifiers 46 through a line 70, through gate 74. The vertical blanking signal causes video amplifiers 46 to turn off during vertical retrace.

Simulated flyback generator 19 generates a pulse which is used by phase comparator 16 as simulated horizontal flyback signal. The pulse generated by simulated flyback generator is slightly delayed from the horizontal flyback signal on line 40. Phase comparator 16 compares the signal from simulated flyback generator 19 with the signal on line 63. Phase comparator 15 generates an error signal to adjustable delay 15 which causes the signal from simulated flyback generator 19 to phase lock with the signal on line 63. The use of the simulated flyback signal from simulated flyback generator 19 causes the oscillating signal on line 63 to be delayed less than it would be if the flyback signal on line 40 were to be used. This negative offset allows adjustable delay 10 to be used to center the display horizontally by providing a positive delay. Phase comparator 16 and adjustable delay 15 cause pulses from pulse generator 11 to be centered in time within pulses generated by simulated flyback generator 19. Phase comparator 13, horizontal oscillator 14, adjustable delay 15 and phase comparator 16 may be, for example, implemented with the use of a 2591 horizontal oscillator integrated circuit available from Signetics Corporation located at 811 East Arques Avenue, Sunnyvale, Calif.

Polarity rectifier/identifier 8 also provides the vertical synchronization through an adjustable delay 23 and through an adjustable delay 22 to a pulse generator 21. Varying adjustable delay 22 and adjustable delay 23 allows for vertical centering of the display. Pulse generator 21 generates pulses at the frequency of operation of the vertical synchronization signal. Pulse generator 21 supplies the generated pulses to vertical deflection circuitry 20. Vertical deflection circuitry 20 drives vertical windings 24 of the deflection yoke controlling the vertical position of collision by electrons on the screen of the monitor. The output of pulse generator 21, through line 70, is also used for blanking of the video display during vertical retrace.

Microprocessor 1 receives the horizontal synchronization signal on line 30 and determines the frequency of this signal. This is done by using a build-in counter internal to microprocessor 1. The horizontal synchronization signal is applied directly to a counter input of microprocessor 1. A subroutine in firmware within microprocessor 1 resets the counter, allows the counter to count while executing a time delay loop for a specific time period, and then stops the counter. The value counted by the counter is the horizontal frequency multiplied by the length of the delay loop. The firmware stores the value counted.

Microprocessor 1 also receives the vertical synchronization signal on an input pin connected to line 31. Microprocessor 1 periodically polls the state of the vertical synchronization signal on the input pin. When the vertical synchronization signal on the input pin makes a transition from one predetermined stated to an opposite state, microprocessor 1 begins to increment an internal register at discrete time intervals until the vertical synchronization signal repeats the transition. At this time microprocessor 1 will cease incrementing the internal register. The value within the register when multiplied by the discrete time intervals will give the period of the vertical synchronization signal. The value is stored.

Microprocessor 1 also receives the horizontal polarity signal on line 28 and the vertical polarity signal on line 29. The horizontal polarity signal indicates to microprocessor 1 the polarity of the horizontal synchronization signal. The vertical polarity signal indicates to microprocessor 1 the polarity of the vertical synchronization signal.

Figure 4:
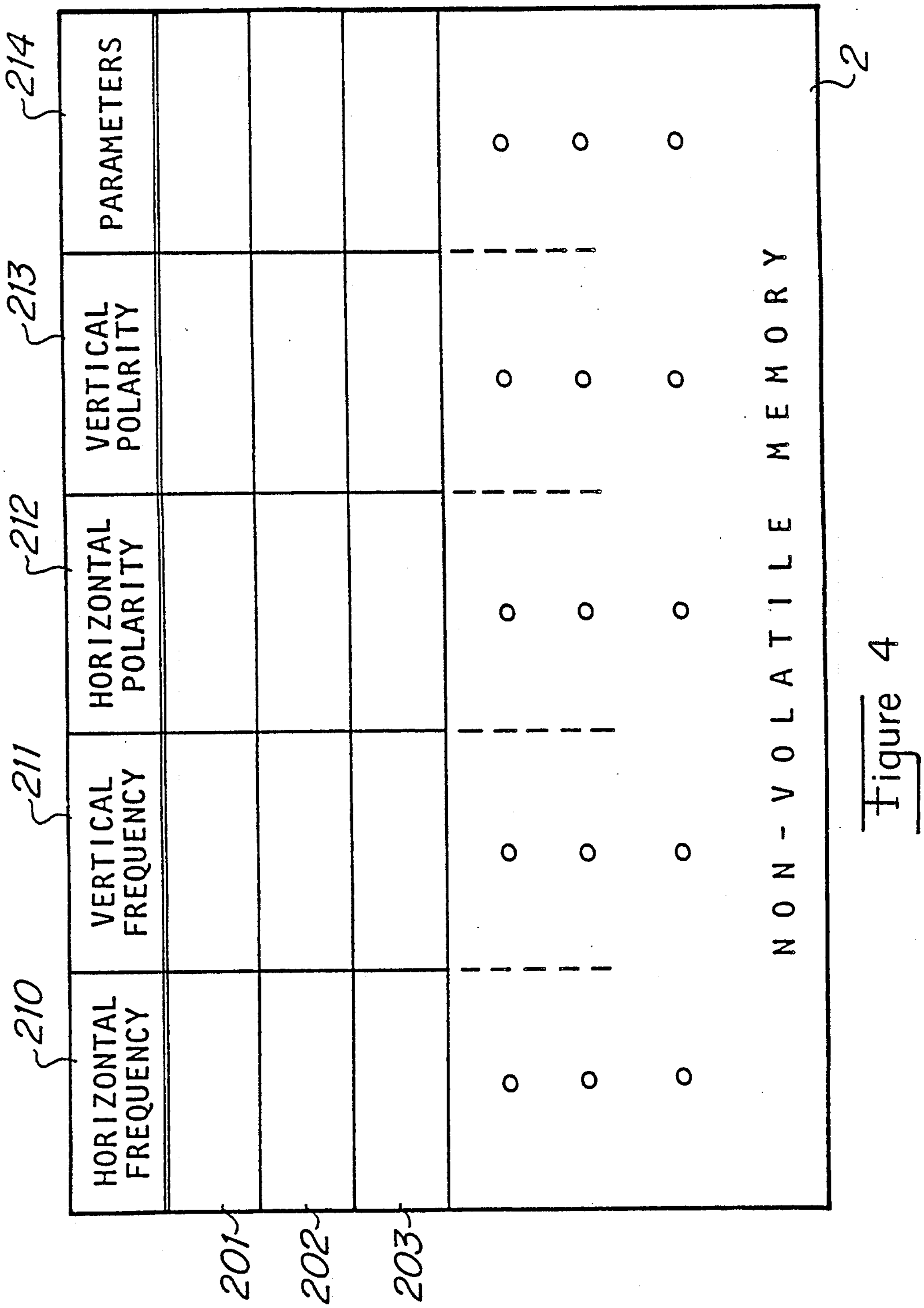
FIG. 4 shows a layout of a non-volatile memory within the microprocessor controlled universal monitor shown in FIG. 1 in accordance with the preferred embodiment of the present invention.

As shown in FIG. 4, in a non-volatile memory 2 microprocessor 1 has stored a plurality of entries 201, 101, 203, etc. Each entry has a value in a column 210 representing horizontal frequency, a value in a column 211 representing vertical frequency, a value in a column 212 representing horizontal polarity, a value in a column 213 representing vertical polarity and values in a column 214 which indicate settings for various parameters of the monitor. These parameters may be, for example, parameters which adjust the free running frequency of horizontal oscillator 14 and parameters which adjust brightness, contrast, horizontal size, vertical size, horizontal centering, vertical centering, red DC offset, green Dc offset, blue DC offset, read gain, blue gain and green gain of the display of the monitor.

When microprocessor 1 notes a change in the frequency or the polarity of the horizontal synchronization signal or the vertical synchronization signal microprocessor 1 determines current values for the frequency and the polarity of the horizontal synchronization signal and the vertical synchronization signal. Microprocessor 1 attempts to match, within predetermined tolerances, the current values with an entry in non-volatile memory 2. If a match is found microprocessor 1 sets the parameters of the monitor in accordance with the parameters contained within the matching entry.

If a match is not found in non-volatile memory 2, microprocessor 1 determines some parameters based on the frequency and the polarity of the horizontal synchronization signal and the vertical synchronization signal. The other parameters of the monitor are set in accordance with default parameters. A new entry is then placed in non-volatile memory 2 with the determined and the default parameters.

Figure 3:
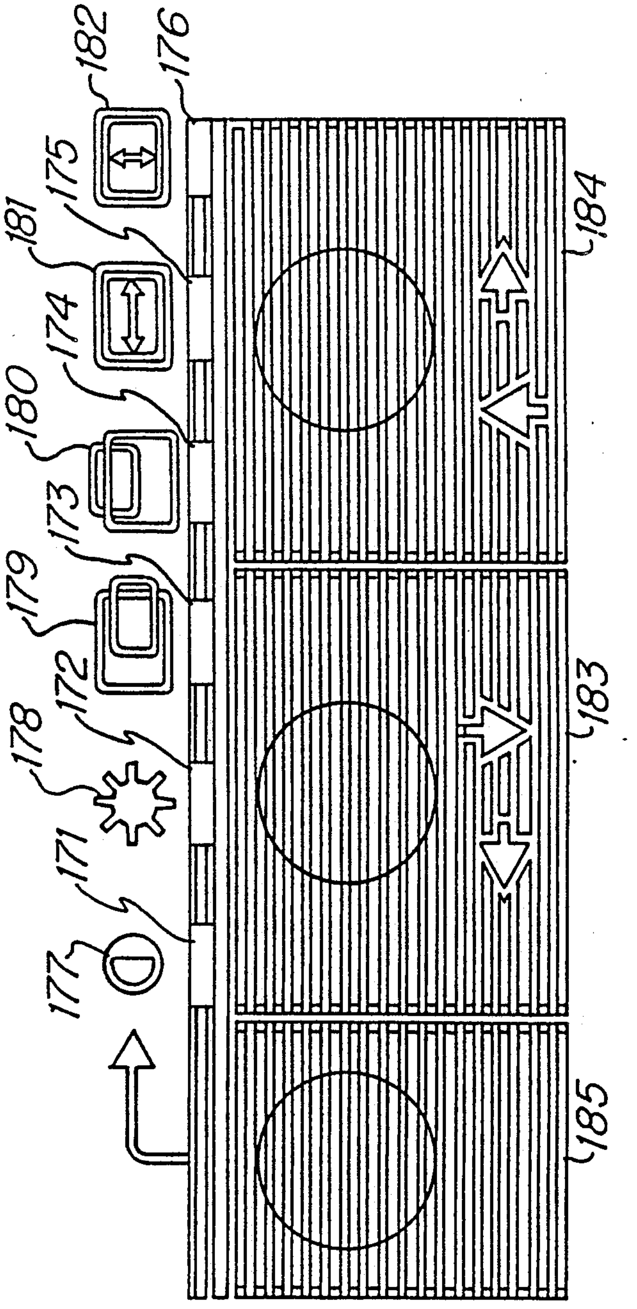
FIG. 3 shows user input switches and function indicator light emitting diodes in accordance with the preferred embodiment of the present invention.

A user may adjust many of the parameters with the use of function light emitting diodes (LEDs) 5 and user input switches 4. For example, a sample control panel 186 is shown in FIG. 3. A plurality of icons represent parameters which may be adjusted by a user. Anicon 177 represents display contrast. An icon 178 represents display brightness. An icon 179 represents horizontal centering. An icon 180 represents vertical centering. An icon 181 represent horizontal size. An icon 182 represents vertical size. Using a contact switch 185 a user may select one of the user adjustable parameters. One of function indicator LEDs 5, represented by LEDs 171, 172, 173, 174, 175, and 176 in FIG. 3, is "On" at a time, indicating the selected parameter. A user may then increase the value of parameter by depressing a contact switch 184. A user may decrease the value of the parameter by depressing a contact switch 183. Alternately the need for contact switch 185 for changing parameters may be replaced by the simultaneous depression of contact switch 183 and contact switch 184.

Microprocessor 1 continuously polls contact switches 183, 184 and 185. In response to the user interaction with contact switches 183, 184 and 185 microprocessor 1 adjusts the monitor parameters. Through function indicator LEDs 5, microprocessor 1 denotes to the user which parameter is being adjusted. The parameters, when changed, are stored in non-volatile memory 2, replacing the values of the parameters in the current entry, that is, the entry which has the then current values for frequency and polarity of the horizontal synchronization signal and the vertical synchronization signal.

Through a serial data bus consisting of a line 33 and a line 34, microprocessor 1 is connected to non-volatile memory 2, to digital-to-analog (D/A) converters 3, and to D/A converters 45. D/A converters 3 and D/A converters 45 are for example a TDA 8444 Octal D/A Converter commercially available from Signetics Corporation. A video amplifier 46 receives video signals on a line 47, a line 48 and a line 49. Video amplifier 46 produces cathode outputs for cathodes of the monitor's cathode ray tube 68 on a line 50, a line 51 and a line 52.

In response to microprocessor 1 D/A converter 45 through a line 53 causes video amplifiers 46 to adjust the DC level of all the cathode outputs (and thus brightness of the display). In response to microprocessor 1 D/A converter 45 through a line 54 causes the gain of all of video amplifiers 46 to be adjusted thus varying contrast of the display on the video monitor. In response to microprocessor 1 D/A converter 45 through a line 55 varies the gain of the video amplifier among video amplifiers 46 which is connected to the red cathode 52. In response to microprocessor 1 D/A converter 45 through a line 55 varies the gain of the video amplifier among video amplifiers 46 which is connected to the green cathode 51. In response to microprocessor 1 D/A converter 45 through a line 44 varies the gain of the video amplifier among video amplifiers 46 which is connected to the blue cathode 50. In response to microprocessor 1 D/A converter 45 through a line 58 causes one of video amplifiers 46 to adjust Dc offset of the red cathode output. In response to microprocessor 1 D/A converter 45 through a line 59 causes one of video amplifiers 46 to adjust Dc offset of the green cathode output. In response to microprocessor 1 D/A converter 45 through a line 60 causes one of video amplifiers 46 to adjust DC offset of the blue cathode output.

Microprocessor 1, through D/A converters 3, controls the output on a line 35, a line 36, a line 37, a line 38 and a line 39. Line 35 serves as input to adjustable delay 10 and is used by microprocessor 1 to adjust the phase of the signal though horizontal windings 25 of the deflection yoke relative to the phase of the horizontal synchronization signal on line 27 for horizontal centering of the display. Line 36 serves as input to adjustable delay 22 and adjustable delay 23. A signal placed on line 36 by microprocessor 1 through D/A converters 3 is used to adjust the phase of the signal through vertical windings 24 of the deflection yoke relative to the phase of the vertical signal on line 61 or line 32, for adjustment of vertical centering of the display.

The signal placed on line 37 tracks the period of the vertical signal and serves as input to adjustable delay 22 and adjustable delay 23. The signal placed on line 37 by microprocessor 1 through D/A converters 3 is used by microprocessor 1 to compensate for the period of the incoming vertical signal, thus allowing for coarse adjustment of the phase of the vertical signal through vertical windings 24 of the deflection yoke relative to the phase of the vertical signal on line 61 or line 32, for adjustment of vertical centering of the display.

The signal on line 38 serves as input to vertical deflection circuit 20 and is used by microprocessor 1 to adjust maximum current through vertical windings 24 of the deflection yoke, thus determining the vertical size of a display on the monitor. The signal on line 39 serves as input to horizontal deflection circuitry 17 and is used by microprocessor 1 to adjust maximum current through horizontal windings 25 of the deflection yoke, thus determining the horizontal size of a display on the monitor.

Microprocessor 1, through a line 42, directly indicates to horizontal oscillator 14 a range of frequencies. A first range is selected for frequencies between 15 kilohertz and 22 kilohertz. A second range is selected for frequencies between 22 kilohertz and 38 kilohertz. Microprocessor 1 is able to cause the video display to blank through a line 71 which is connected to video amplifiers 46 through gate 74.

Figure 2:
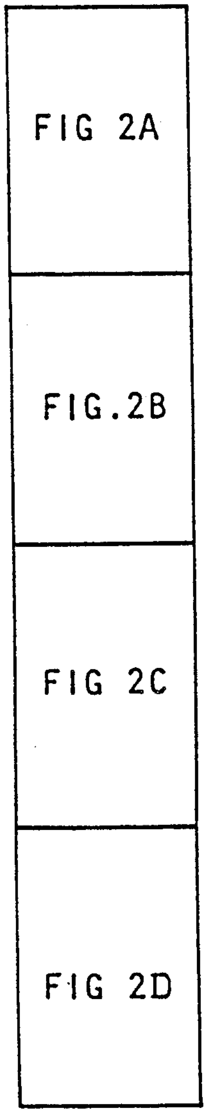
FIGS. 2 and 2A–2D are flowcharts of a program within the microprocessor of the microprocessor controlled universal monitor shown in FIG. 1.
Figure 1A:
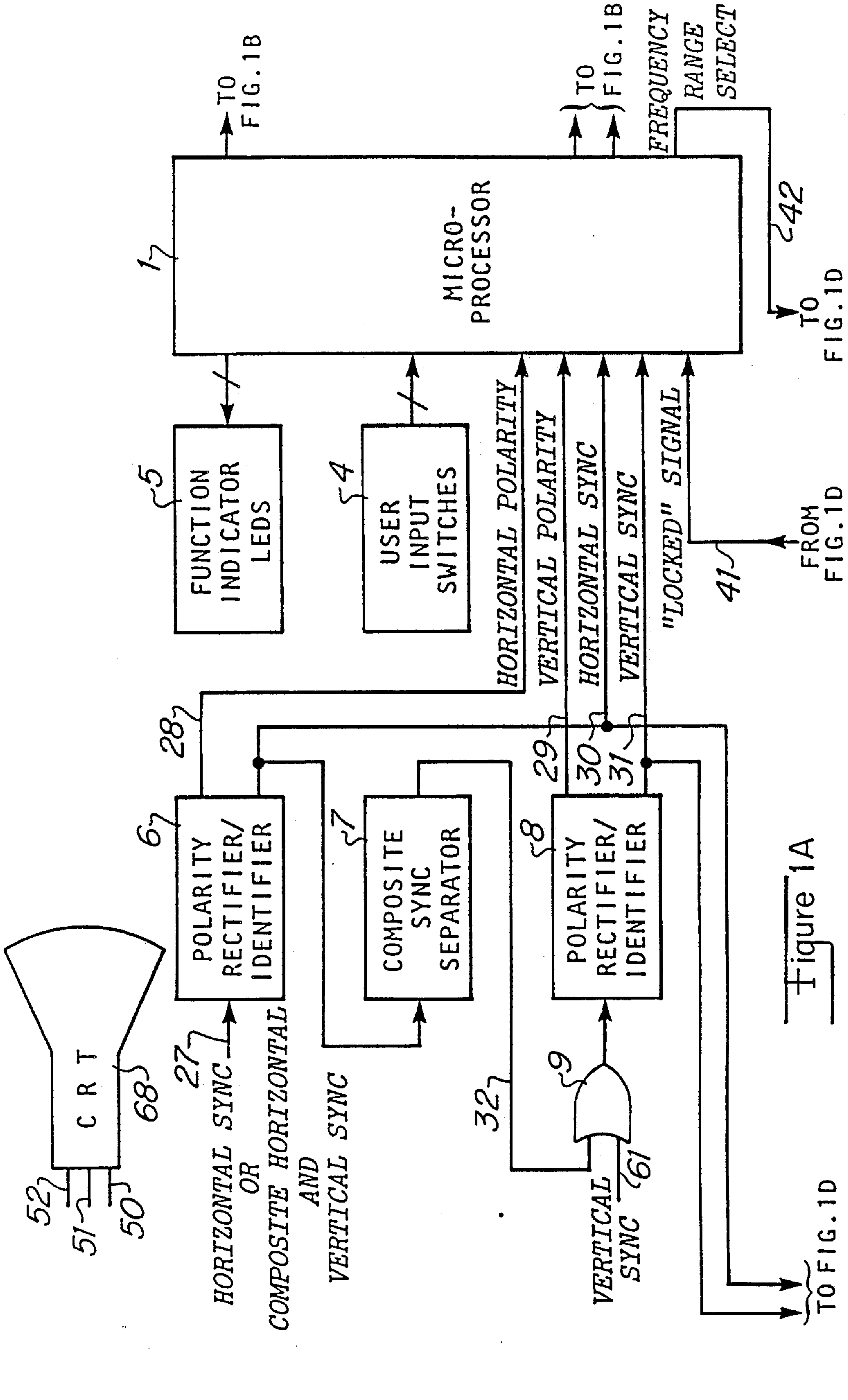
Figure 1B:
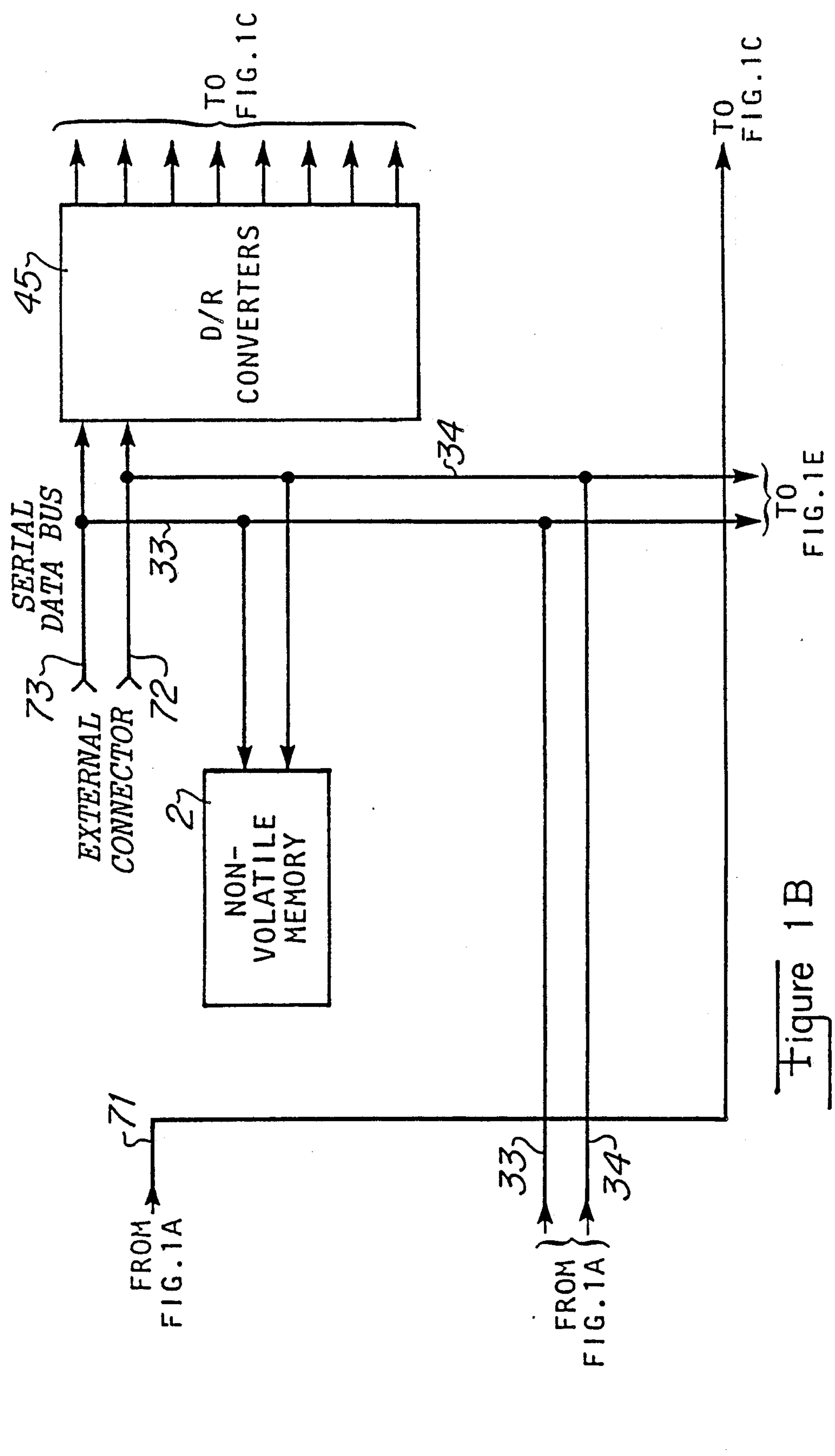
Figure 1C:
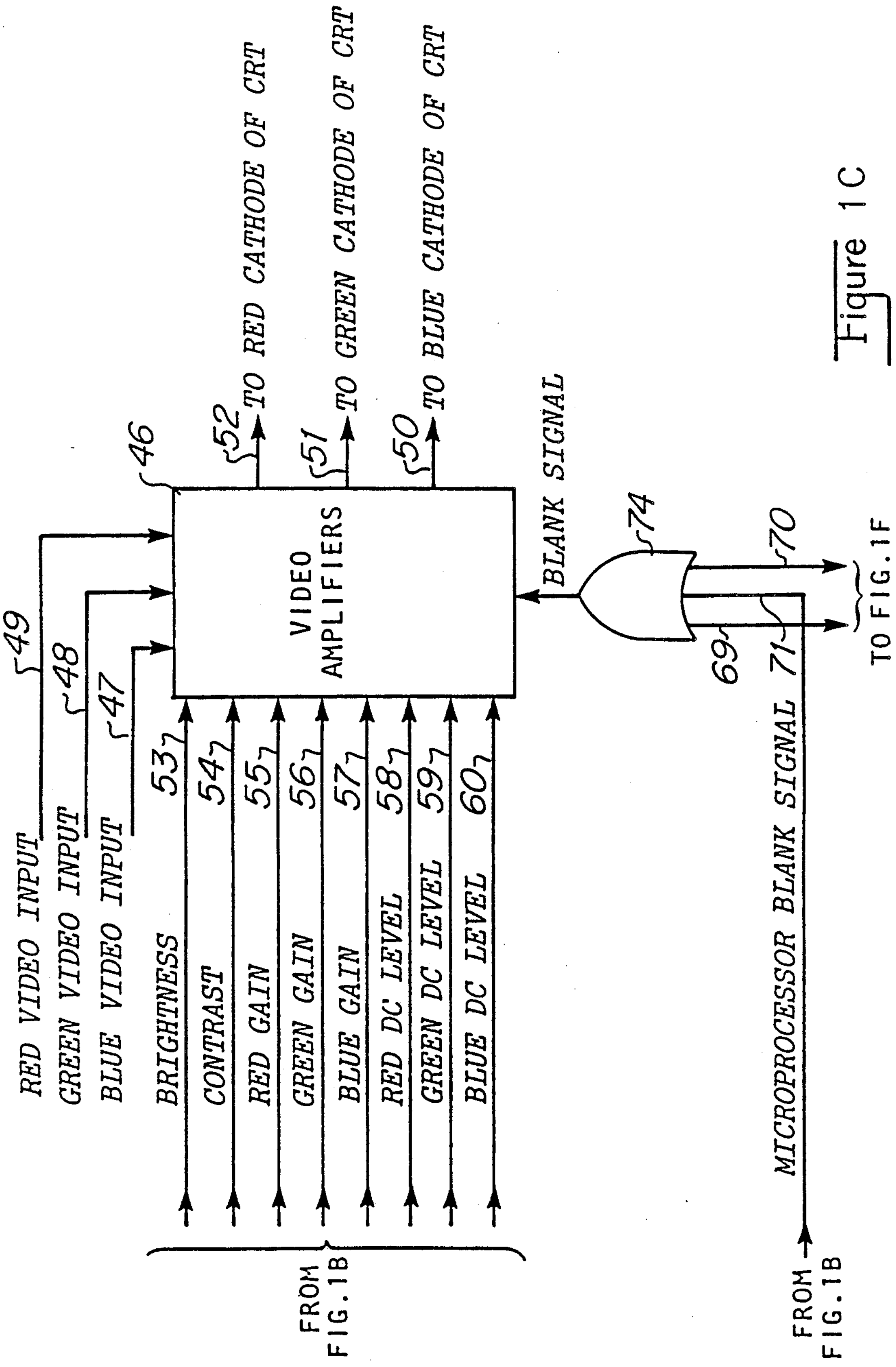
Figure 1D:
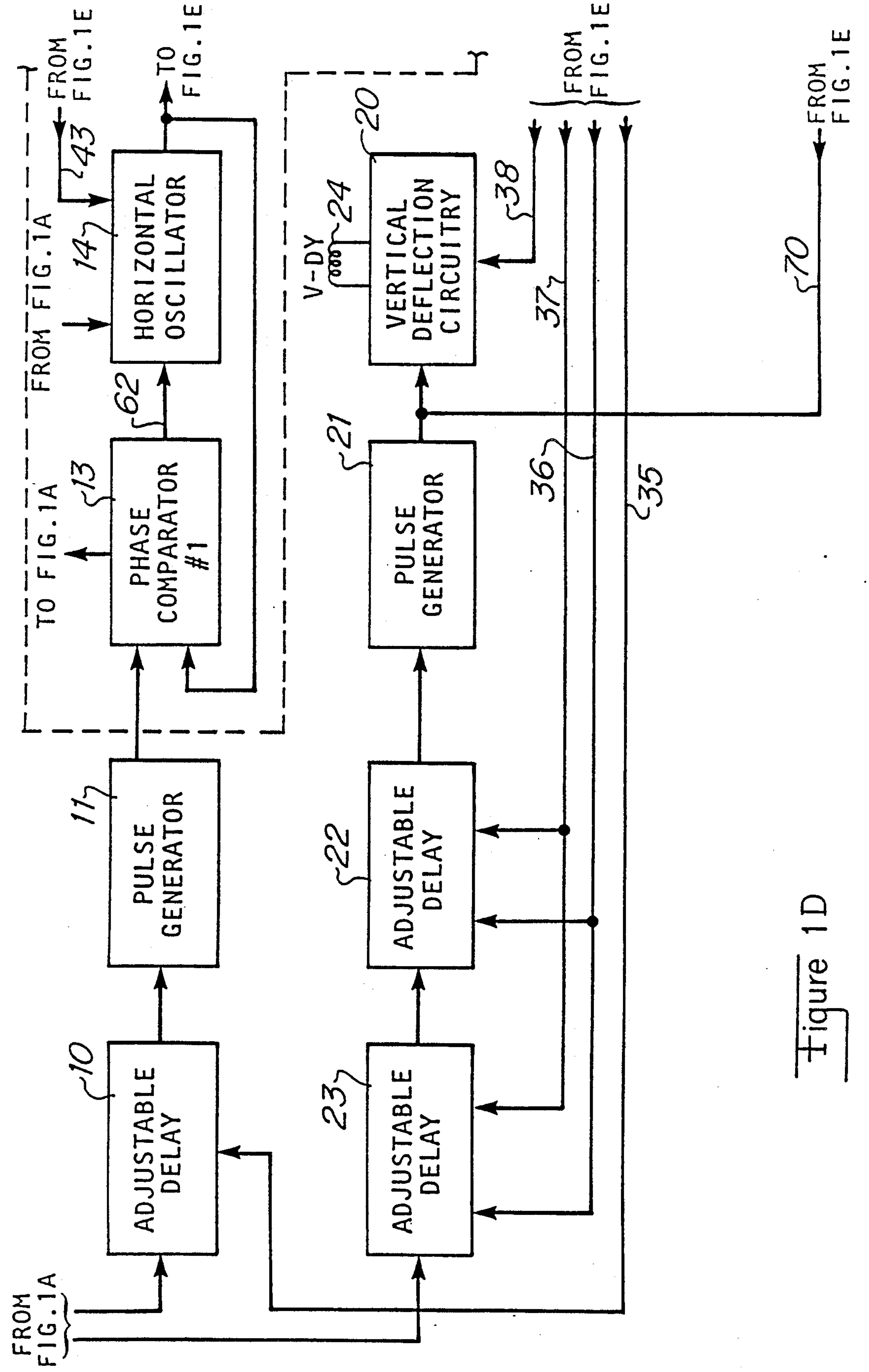
Figure 1E:
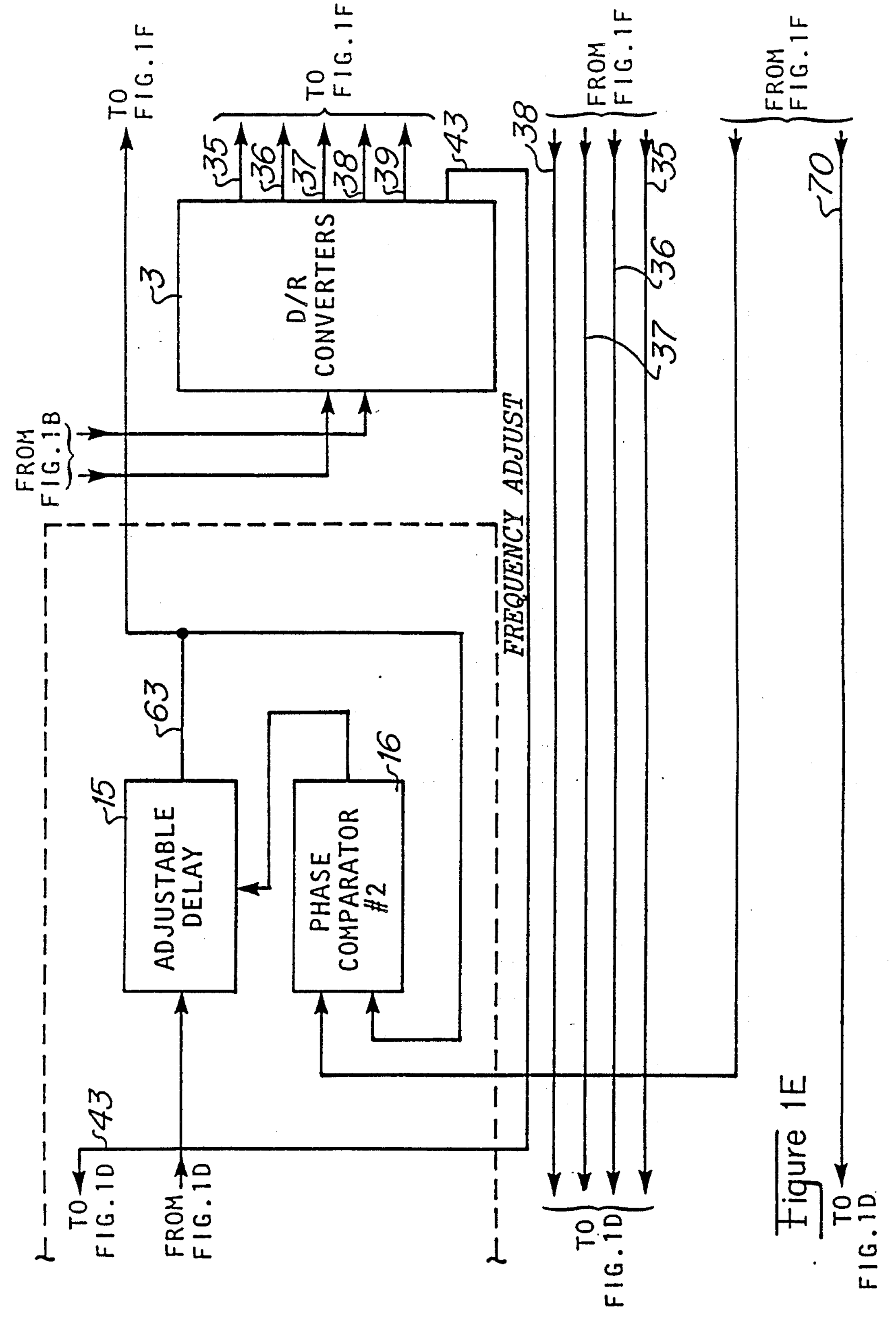
Figure 1F:
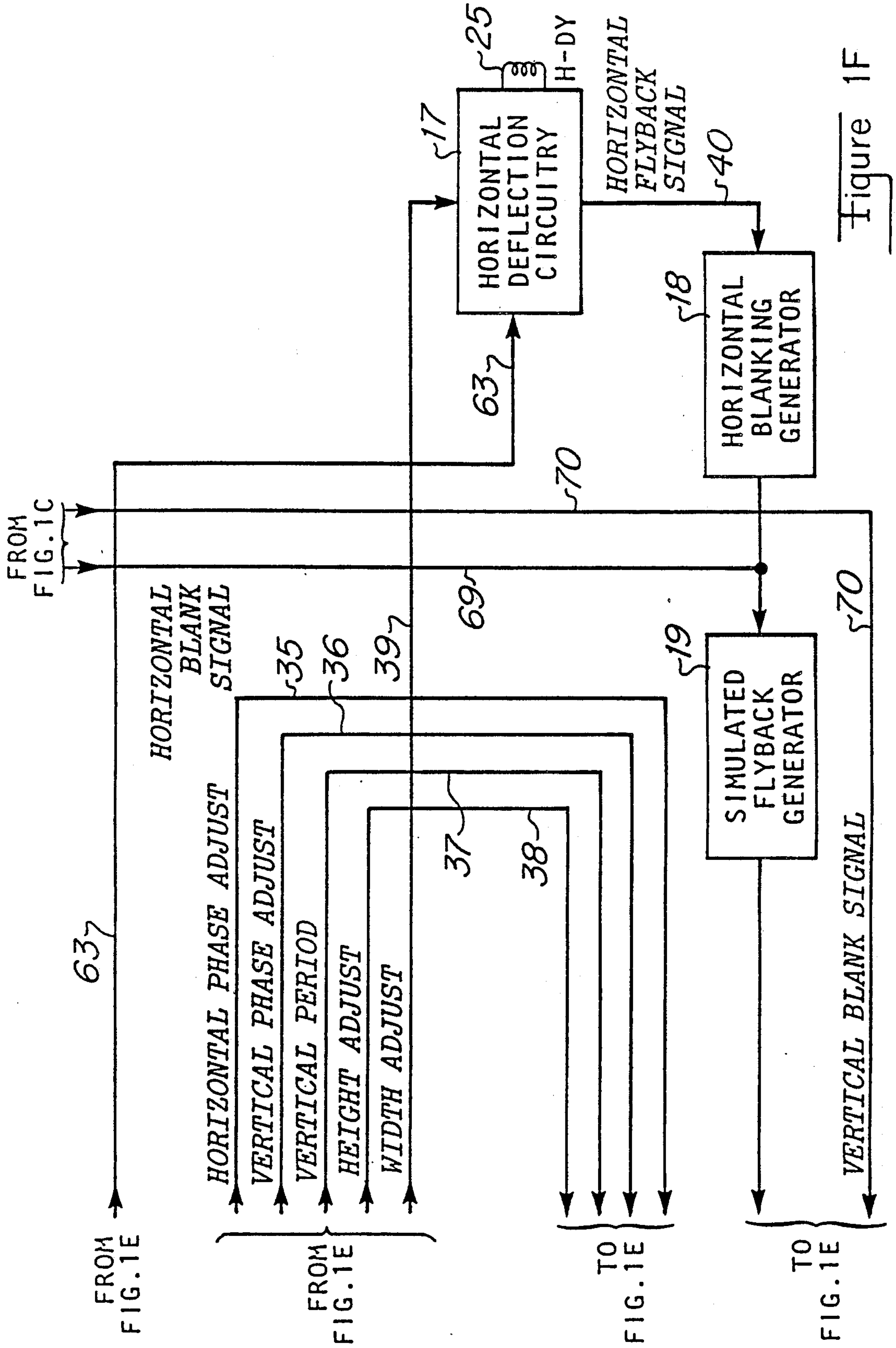
Figure 2A:
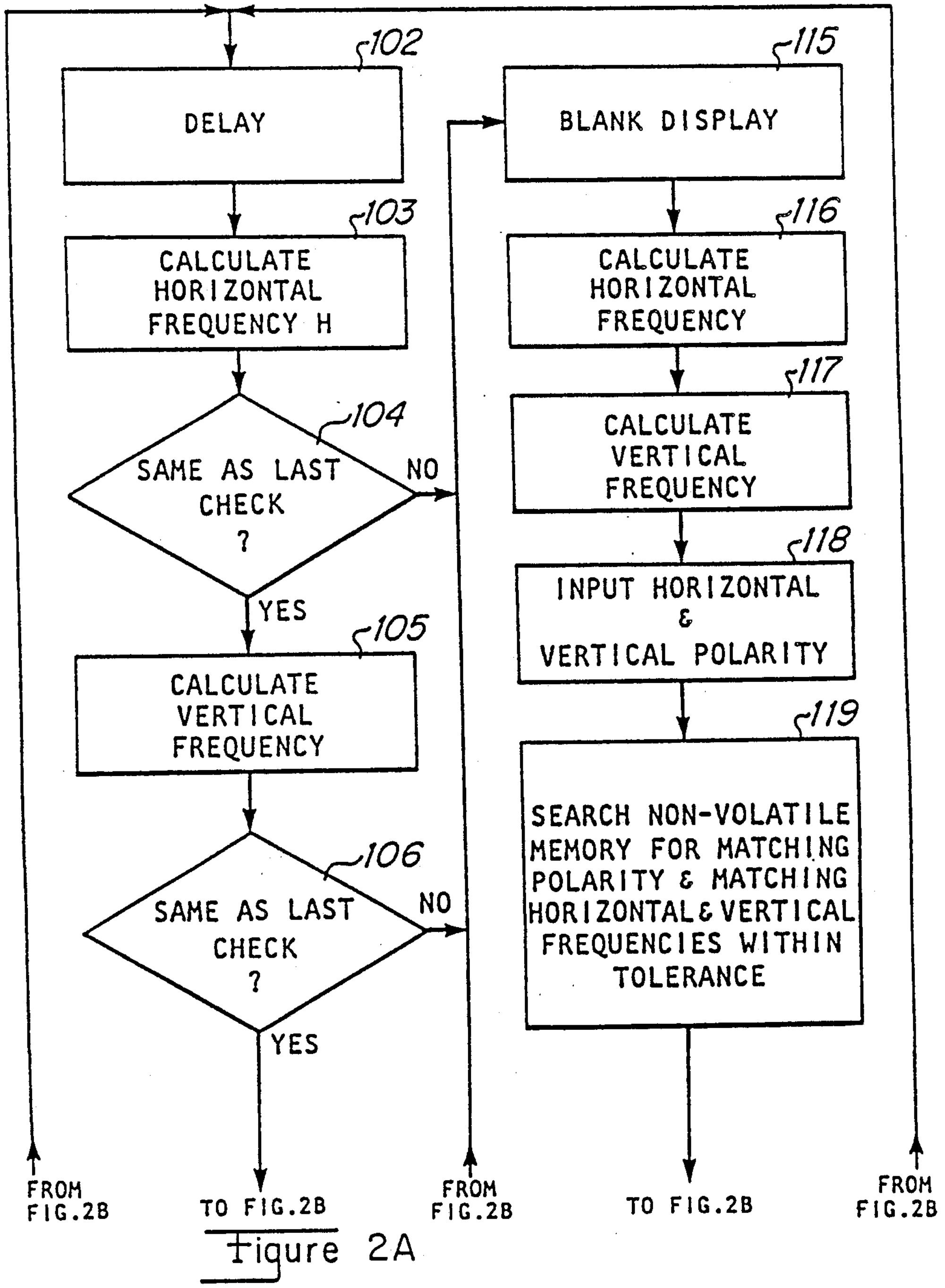
Figure 2B:
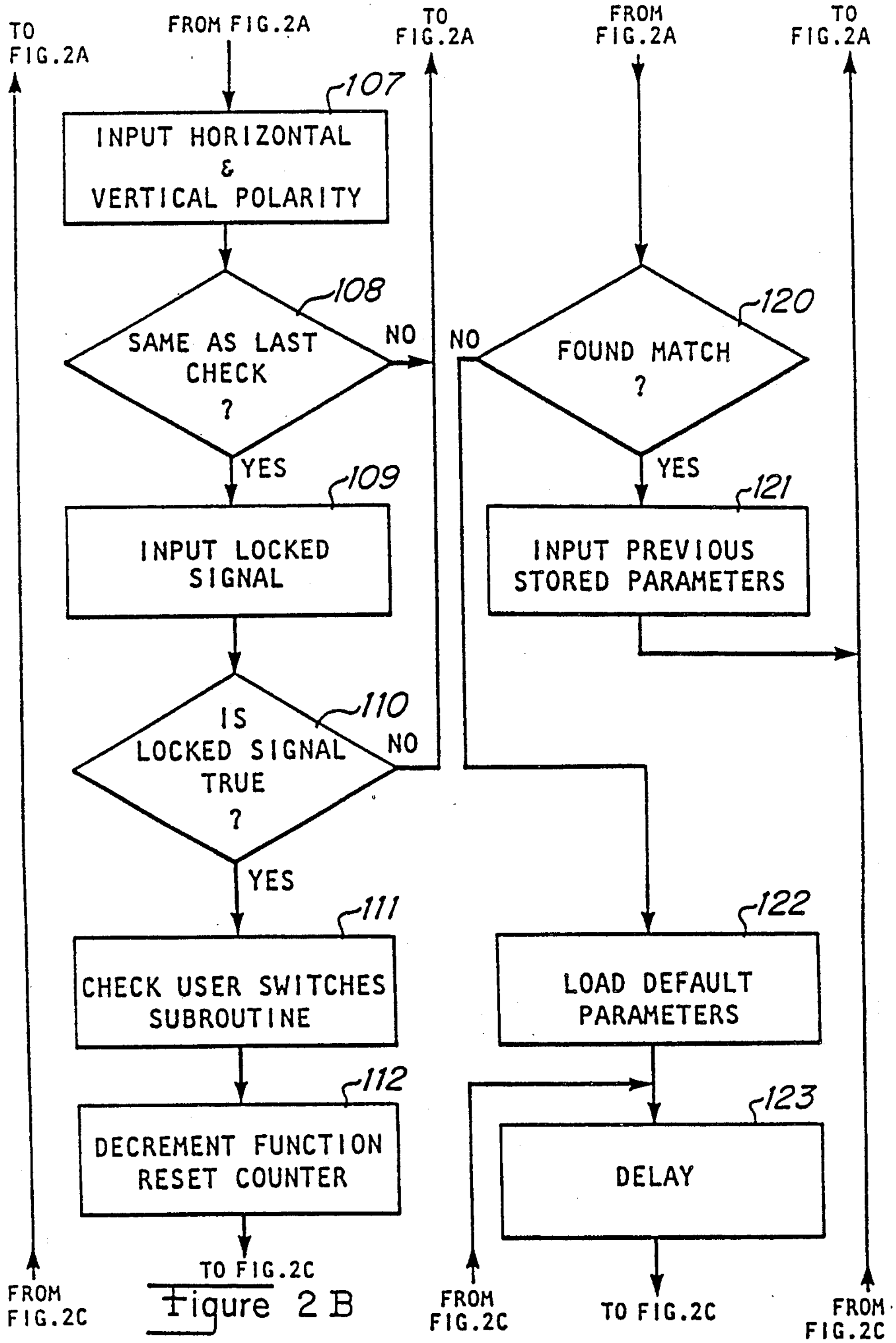
Figure 2C:
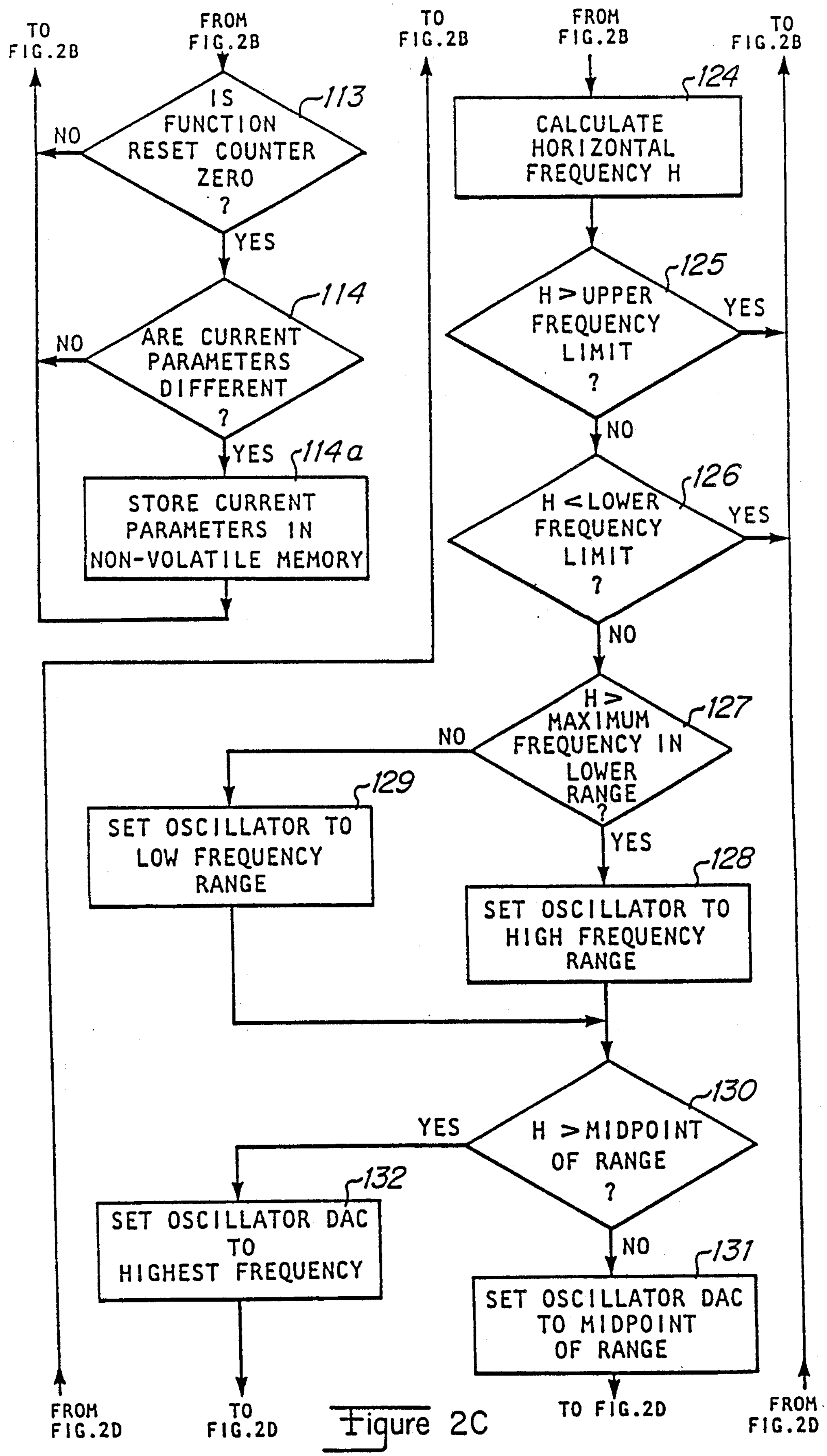
Figure 2D:
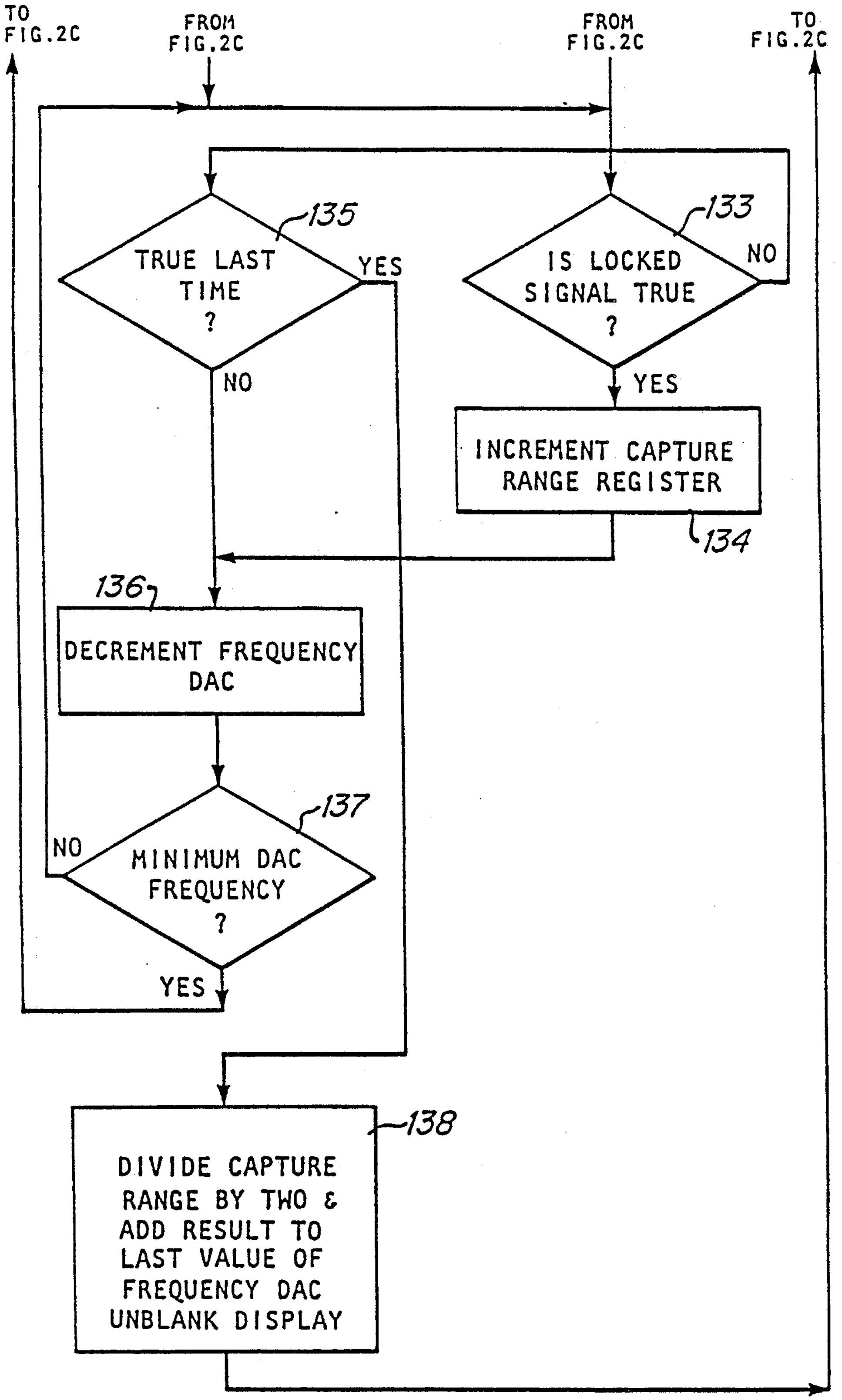

A flowchart for a programming run by microprocessor 1 is shown in FIG. 2. The program is an endless loop. At a step 102, microprocessor 1 is in a wait state for a predetermined time. At a step 103, microprocessor calculates the horizontal frequency based on the frequency of the horizontal synchronization signal on line 30. At a step 104 microprocessor 1 determines whether the current value of the horizontal frequency is the same as the horizontal frequency when microprocessor 1 last checked horizontal frequency. If so, at a step 105, microprocessor calculates the vertical frequency based on the frequency of the vertical synchronization signal on line 31. At a step 106 microprocessor 1 determines whether the current value of the vertical frequency is the same as the vertical frequency when microprocessor 1 last checked vertical frequency. If so, microprocessor advances to a step 107.

At step 107 microprocessor 1 checks horizontal polarity using the signal on line 28 and checks vertical polarity using the signal on line 29. At a step 108 microprocessor determines whether both horizontal polarity and vertical polarity remain unchanged from the last check. If so, at a step 109 microprocessor 1 checks the value on line 41. If the value on line 41 indicates that the signal is locked, at a step 110, microprocessor advances to a step 111.

In step 111 microprocessor 1 runs a subroutine which checks user input switches 4. In response to user inputs through user input switches 4 microprocessor 1 changes selected parameters. In a step 112 microprocessor 1 decrements a function reset counter. If, in a step 113, microprocessor 1 determines that the function reset counter is zero and in a step 114 microprocessor 1 determines that the current parameters are different than the parameters stored in non-volatile memory 2, microprocessor 1, in a step 114*a*, stores the presently used parameters in non-volatile memory 2. Microprocessor 1 then returns to step 102.

If microprocessor 1 determines at step 104 that the horizontal frequency has changed, or determines at step 106 that the vertical frequency has changed, or determines at step 108 that either the horizontal or vertical polarity has changed or determines at step 110 that the signal is no longer locked, microprocessor will proceed to a step 115.

At step 115, microprocessor 1 through a line 69 causes the display to be blanked. In a step 116 microprocessor 1 calculates the horizontal frequency based on the frequency of the horizontal signal on line 30. In a step 117 microprocessor 1 calculates the vertical frequency based on the frequency of the vertical signal on line 31. In a step 118 microprocessor 1 inputs the value of the horizontal polarity signal on line 28 and inputs the value of the vertical polarity signal on line 19. In a step 119 microprocessor 1 searches non-volatile memory 4 for a entry which matches the horizontal frequency, the vertical frequency, the horizontal polarity and the vertical polarity from steps 116, 117 and 118. If microprocessor 1, at a step 120, finds an entry which matches, the parameters from column 214 of the entry are loaded by microprocessor 1 and used as the current parameters. Microprocessor 1 then returns to step 102. If microprocessor 1 does not find an entry which matches microprocessor 1, at a step 122, loads and uses the default parameters. Microprocessor then enters a horizontal synchronization subroutine beginning at a step 123.

At step 123 microprocessor 1 is in a wait state for a predetermined time. At a step 124 microprocessor 1 calculates the horizontal frequency based on the frequency of the horizontal synchronization signal on line 30. At a step 125 determines whether the horizontal frequency calculated at step 124 is greater than the upper limit of frequencies for which the monitor is designed. If so, microprocessor 1 exits the horizontal synchronization subroutine and returns to step 102. If the horizontal frequency calculated at step 124 is less than the upper limit of frequencies for which the monitor is designed, microprocessor 1, at a step 126, determines whether the horizontal frequency calculated at step 124 is less than the lower limit of frequencies for which the monitor is designed. If so, microprocessor 1 exits the horizontal synchronization subroutine and returns to step 102.

If the horizontal frequency calculated at step 124 is within the frequency ranges for which the monitor is designed, microprocessor 1, at a step 127 determines to which frequency range horizontal oscillator 14 is to be set. If the horizontal frequency calculated in step 124 is greater than the maximum frequency in the lower range, microprocessor 1 in a step 128 sets horizontal oscillator 14 to the high frequency range (22–38 KHz). If the horizontal frequency calculated in step 124 is not greater than the maximum frequency in the lower range (22 KHz) microprocessor 1 in a step 129 sets horizontal oscillator 14 to the low frequency range (15–22 KHz).

In steps 130–138, microprocessor 1 through the serial data bus, through DAC 3 through line 43 adjusts the frequency of horizontal oscillator 14 to the mid-range of frequencies for which phase comparator 13 through line 41 indicates to microprocessor 1 that pulses generated by pulse generator 11 are locked in synchronization with the signal generated by horizontal oscillator 14. In a step 130 microprocessor 1 determines whether the frequency calculated in step 124 is greater than the midpoint of the currently set frequency range of horizontal oscillator 14. If the frequency calculated in step 124 is greater than the midpoint of the current frequency range, microprocessor 1 in step 132 sets horizontal oscillator 14 to its highest frequency in the current frequency range (i.e., 22 KHz if in the lower frequency range and 38 KHz if in the higher frequency range. If the frequency calculated in step 124 is not greater than the midpoint frequency of the current frequency range, microprocessor 1 in step 131 sets horizontal oscillator 14 to the midpoint of the current frequency range. This further divides the frequency range of the search procedure, reducing the time required to determine the capture range as described below.

Microprocessor 1 in steps 133–137 executes a loop in which a capture range is determined for which phase comparator 13 through line 41 indicates to microprocessor 1 that pulses generated by pulse generator 11 are locked in synchronization with the signal generated by horizontal oscillator 14. ONce the capture range has been calculated microprocessor 1 in a step 138 sets horizontal oscillator 14 to the middle of the capture range. Microprocessor 1 causes the display no long to be blanked and then exits the horizontal synchronization subroutine and returns to step 102.

I claim:

1. In a video monitor producing a video display, a device for allowing a user to adjust parameters of the video monitor, the device comprising:

switches, available to the user for manipulation;

control lines for adjusting parameters;

digital-to-analog converting means, coupled to the control lines, for placing analog voltage signals on the control lines;

processor control means, coupled to the switches and the digital-to-analog converting means, for receiving input from manipulation of the switches, and for directing the digital-to-analog converting means as to the voltage levels of the analog voltage signals placed on the control lines;

wherein the parameters include video display vertical size and video display horizontal size.

2. A device as in claim 1 additionally comprising non-volatile memory means (2), coupled to the processor control means (1), for storing values of the parameters of the video monitor.

3. A device as in claim 2 wherein the parameters additionally include brightness of the video display, contrast of the video display, gain of a red video signal video amplifier, gain of a green video signal video amplifier, gain of a blue video signal video amplifier, red video signal DC voltage level, green video signal DC voltage level and blue video signal DC voltage level.

4. A device as in claim 2 additionally comprising:

a data bus (33, 34) coupling the processor control means (1) to the digital-to-analog converting means (3, 45) and coupling the processor control mean s(1) to the non-volatile memory means (2); and an external connector (72, 73) connected to the data bus (33, 34) which allows an external source to vary parameters of the video display and to access the non-volatile memory means (2).

5. A device as in claim 4 wherein the parameters which may be varied by an external source include gain of a red video signal video amplifier, gain of a green video signal video amplifier, gain of a blue video signal video amplifier, red video signal DC voltage level, green video signal DC voltage level and blue video signal DC voltage level.

6. A device as in claim 1 wherein the parameters a user may affect through manipulation of the switches include brightness of the video display, contrast of the video display, vertical centering of the video display and horizontal centering of the display.

7. In a video monitor producing a video display, a device for allowing a user to adjust parameters of the video monitor, the device comprising:

switches, available to the user for manipulation control lines for adjusting parameters;

digital-to-analog converting means, coupled to the control lines, for placing analog voltage signals on the control lines;

processor control means, coupled to the switches and the digital-to-analog converting means, for receiving input from manipulation of the switches, and for directing the digital-to-analog converting means as to the voltage levels of the analog voltage signals placed on the control lines; and, user feedback means, coupled to the processor control means for indicating to the user information about how manipulating the switches affects the parameters, wherein the processor control means indicates to the user through the user feedback means how manipulating switches affects the parameters.

8. In a video monitor producing a video display, a device for allowing an external source to adjust parameters of the video monitor, the device comprising:

control lines (35-39, 43, 53-60) for adjusting parameters;

digital-to-analog converting means (3, 45), coupled to the control lines (35-39, 43, 53-60), for placing analog voltage signals on the control lines (35-39, 43, 53-60);

a data bus (33, 34) coupled to the digital-to-analog converting means (3, 45);

processor control means (1), coupled to the data bus (33, 34), for directing the digital-to-analog converting means (3, 45) as to the voltage levels of the analog voltage signals placed on the control lines (35-39, 43, 53-60);

memory means (2), coupled to the data bus (33, 34), for storing values of the parameters of the video monitor;

an external connector (72, 73) coupled to the data bus (33, 34) which allows the external source to access the digital-to-analog converting means (3, 45), the processor control means (1) and the memory means (2) whereby the external source may direct the digital-to-analog converting means (3, 45) as to voltage levels of the analog voltage signals placed on the control lines (35-39, 43, 53-60) and may access modify values of parameters stored in the memory means (2).

9. In a video monitor producing a video display viewable by a user, the video monitor including a cathode ray tube (68); a deflection yoke, coupled to the cathode ray tube (68), the deflection yoke having horizontal windings (25) and the deflection yoke deflecting electrons passing through the cathode ray tube (68); horizontal deflection circuitry (17), electrically coupled to the horizontal windings (25), which controls current through the horizontal windings (25); and a horizontal oscillator (14) for generating a timing signal for application to the horizontal deflection circuitry (17), a device for allowing adjustment of parameters of the video monitor, the device comprising:

control lines (35-39, 43, 53-60) for adjusting values of the parameters, the control lines (35-39, 43, 53-60) including a frequency adjust control line (43) coupled to the horizontal oscillator (14), the free-running frequency of the horizontal oscillator (14) varying dependent on a voltage value of a signal on the frequency adjust control line (43);

digital-to-analog converting means (3, 45), coupled to the control lines (35-39, 43, 53-60), for placing analog voltage signals on the control lines (35-39, 43, 53-60); and, processor control means (1), coupled to the digital-to-analog converting means (3, 45), for directing the digital-to-analog converting means (3, 45) as to the voltage levels of the analog voltage signals placed on the control lines (35-39, 43, 53-60), the processor control mans (1) including a first input (30) upon which is placed a horizontal synchronization signal and a second input (31) upon which is placed a vertical synchronization signal, the processor control means (1) directing the digital-to-analog converting means (3, 45) to place on the frequency adjust control line (43) an analog voltage signal based on the frequency of the horizontal synchronization signal.

10. A device as in claim 9 additionally comprising a non-volatile memory (2), coupled to the processor control means (1), within which the processor control means (1) stores values of the parameters, the parameters being referenced by the processor control means (1), at least in part, by the frequency of the horizontal synchronization signal and the vertical synchronization signal.

11. A device as in claim 10 wherein the processor control means (1) additionally includes a third input (28) on which is placed a horizontal polarity signal indicating polarity of the horizontal synchronization signal and a fourth input (29) on which is placed a vertical polarity signal indicating polarity of the vertical synchronization signal and wherein the processor control means (1) additionally uses the horizontal polarity signal and the vertical polarity signal when referencing values of parameters stored in the non-volatile memory (2).

12. A device as in claim 9 additionally comprising switches (183, 184, 185), coupled to the processor control mean (1), available to the user for manipulation;

user feedback means (177–182), coupled to the processor control means (1), for indicating to the user information about how manipulating the switches (183, 184, 185) affects the parameters;

wherein the processor control means (1) receives input from manipulation of the switches (183, 184, 185), indicates to the user through the user feedback means (177–182) how manipulating switches (183, 184, 185) affects values of the parameters of the video monitor and directs the digital-to-analog converting means (3, 45) as to the voltage levels of at least some of the analog voltage signals placed on the control lines (3514 39, 43, 53–60) based on user manipulation of the switches (183, 184, 185).

13. A device as in claim 9 additionally comprising:

non-volatile memory means (2), coupled to the processor control means (1), for storing values of the parameters of the video monitor.

14. A device as in claim 13 wherein the parameters include video display vertical size, video display horizontal size, brightness of the video display, contrast of the video display, gain of a red video signal video amplifier, gain of a green video signal video amplifier, gain of a blue video signal video amplifier, red video signal DC voltage level, green video signal DC voltage level and blue video signal DC voltage level.

15. A device as in claim 14 wherein the value of parameters stored in the non-volatile memory means (2) are referenced by the processor control means (1), at least in part, by the frequency of the horizontal synchronization signal and the vertical synchronization signal.

16. A device as in claim 15 wherein the processor control means (1) additionally includes a third input (28) on which is placed a horizontal polarity signal indicating polarity of the horizontal synchronization signal and a fourth input (29) on which is placed a vertical polarity signal indicating polarity of the vertical synchronization signal and wherein the processor control means (1) additionally uses the horizontal polarity signal and the vertical polarity signal when referencing values of parameters stored in the non-volatile memory means (2).

17. In a video monitor producing a video display viewable by a user, the video monitor including a cathode ray tube; a deflection yoke, coupled to the cathode ray tube, the deflection yoke having horizontal windings and vertical windings and the deflection yoke deflecting electrons passing through the cathode ray tube; horizontal deflection circuitry, electrically coupled to the horizontal windings, which controls current through the horizontal windings; a horizontal oscillator for generating a timing signal for application to the horizontal deflection circuitry; a control processor having a first input upon which is placed a horizontal synchronization signal and a second input upon which is placed a vertical synchronization signal; and a memory; a method for adjusting parameters of the video monitor, the method comprising the steps of:

(a) storing entries of parameters values in the memory, each entry for parameter values including a value for frequency of a horizontal synchronization signal, a value for frequency of a vertical synchronization signal, a value for polarity of the horizontal synchronization signal, a value for polarity of the vertical synchronization signal;

(b) periodically measuring by the control processor new values for the frequency of the horizontal synchronization signal, for the polarity of the horizontal synchronization signal and for the polarity of the vertical synchronization signal; and, (c) when any of the new values measured in step (b) vary from values measured immediately prior to measurement of the new values, performing the following substeps:

(c1) searching the memory for an entry which has a value for frequency of a horizontal synchronization signal, a value for frequency of a vertical synchronization signal, a value for polarity of the horizontal synchronization signal and a value for polarity of the vertical synchronization signal which all match the new values, and (c2) when substep (c1) results in the discovery of an entry, adjusting the parameters of the video monitor to match the values of the discovered entry.

18. A method as in claim 17 additionally comprising the following substep:

(c3) when substep; (c1) does not result in the discovery of an entry, adjusting the timing signal generated by the horizontal oscillator to match the new value for the horizontal synchronization signal.

19. A method as in claim 18 wherein in step (c3), when the timing signal generated by the horizontal oscillator is adjusted, also adjusting brightness of the video display, contrast of the video display, gain of a red video signal video amplifier, gain of a green video signal video amplifier, gain of a blue video signal video amplifier, red video signal DC voltage level, green video signal DC voltage level and blue video signal DC voltage level to match default values.

20. A method as in claim 18 additionally comprising the following steps:

(d) periodically checking by the control processor (1) for user requests to adjust parameters of the video monitor;

(e) adjustment of values of parameters by the control processor (1) when detected in step (d).

21. A method as in claim 20 additionally comprising the step of:

(f) periodically storing in an entry in the memory (2) current values for the parameters of the video monitor.

22. A method as in claim 20 wherein in step (a) each entry for parameter values additionally includes a value for brightness of the video display, a value for contrast of the video display, a value for gain of a red video signal video amplifier, a value for gain of a green video signal video amplifier, a value for gain of a blue video signal video amplifier, a value for red video signal DC voltage level, a value for green video signal DC voltage level and a value for blue video signal DC voltage level.

* * * * *